(12) United States Patent
Siegel et al.

(10) Patent No.: US 11,234,314 B2
(45) Date of Patent: Jan. 25, 2022

(54) INTELLIGENT CONTROL OF THE LIGHT CHARACTERISTIC

(71) Applicant: ZUMTOBEL LIGHTING GMBH, Dornbirn (AT)

(72) Inventors: Martin Siegel, Eriskirch (DE); Nikolaus Ess, Satteins (AT); Stefan Von Terzi, Munich (DE); Herbert Pamminger, Freilassing (DE)

(73) Assignee: Zumtobel Lighting GmbH, Dornbirn (AT)

( * ) Notice: Subject to any disclaimer, the term of this patent is extended or adjusted under 35 U.S.C. 154(b) by 240 days.

(21) Appl. No.: 16/493,323

(22) PCT Filed: Mar. 15, 2018

(86) PCT No.: PCT/EP2018/056599
§ 371 (c)(1),
(2) Date: Sep. 12, 2019

(87) PCT Pub. No.: WO2018/167239
PCT Pub. Date: Sep. 20, 2018

(65) Prior Publication Data
US 2021/0289603 A1    Sep. 16, 2021

(30) Foreign Application Priority Data
Mar. 16, 2017   (DE) .................... 10 2017 204 429.2

(51) Int. Cl.
| H05B 47/115 | (2020.01) |
| H05B 47/11 | (2020.01) |
| G06K 9/00 | (2006.01) |
| H05B 47/11 | (2020.01) |

(52) U.S. Cl.
CPC ....... *H05B 47/115* (2020.01); *G06K 9/00771* (2013.01); *H05B 47/11* (2020.01)

(58) Field of Classification Search
None
See application file for complete search history.

(56) References Cited

U.S. PATENT DOCUMENTS

| 6,741,175 B1 | 5/2004 | Rauch |
| 7,940,191 B2 | 5/2011 | Hierzer |
| (Continued) | | |

FOREIGN PATENT DOCUMENTS

| DE | 10 2013 204 145 | 11/2014 |
| EP | 0 476 562 | 3/1992 |
| (Continued) | | |

OTHER PUBLICATIONS

PCT Search Report dated May 17, 2018 in parent PCT application PCT/EP2018/056599.

(Continued)

*Primary Examiner* — Jany Richardson
(74) *Attorney, Agent, or Firm* — Andrus Intellectual Property Law, LLP

(57) ABSTRACT

The invention relates to a lighting device, which is controlled in order to light at least one scene (151-158) in an area (150) with a first light characteristic. Measurement data is received, which is indicative of the behavior of a flow of people (180) in the area (150) during the lighting of the at least one scene (151-158) with the first light characteristic. Then a second light characteristic is determined on the basis of the measurement data. The lighting device is controlled in order to light the at least one scene (151-158) with the second light characteristic.

16 Claims, 7 Drawing Sheets

(56) References Cited

U.S. PATENT DOCUMENTS

| | | |
|---|---|---|
| 9,538,626 B1 | 1/2017 | Hung et al. |
| 2015/0084518 A1* | 3/2015 | Takahashi .............. H05B 47/12 |
| | | 315/152 |

FOREIGN PATENT DOCUMENTS

| | | |
|---|---|---|
| EP | 0 941 527 | 4/2001 |
| EP | 2 045 510 | 4/2009 |
| WO | 2014/121329 | 8/2014 |

OTHER PUBLICATIONS

German search report dated Dec. 14, 2017 in priority German application 10 2017 204 429.2.

* cited by examiner

INTELLIGENT CONTROL OF THE LIGHT CHARACTERISTIC

CROSS REFERENCE TO RELATED APPLICATION

The present application is the U.S. national stage application of international application PCT/EP2018/056599 filed Mar. 15, 2018, which international application was published on Sep. 20, 2018 as International Publication WO 2018/167239 A1. The international application claims priority to German Patent Application 10 2017 204 429.2 filed Mar. 16, 2017.

TECHNICAL FIELD

Various examples of the invention generally relate to techniques for controlling a light characteristic of a lighting device for lighting at least one scene in an area. Various examples of the invention relate in particular to determining the light characteristic on the basis of measurement data indicative of the behavior of a flow of people in said area.

BACKGROUND

Controlling flows of people can be desirable in a variety of scenarios. Examples in particular include buildings or rooms having a comparatively small amount of space per participant in the flow of people. Other examples include buildings or rooms having a high speed of the flow of people, i.e. many participants per unit of time that pass through a specific area. In railway stations or airports, for example, it may be necessary to control the flows of people in order to prevent compaction or delays in the flow of people.

It is often possible that the behavior of a flow of people in a building or room varies as a function of time. In the morning, for example, the flow of people can behave differently than in the afternoon, etc. It may then be necessary to actively control the flow of people by influencing the participants in the flow of people in a suitable and time-variable manner. Reference implementations, for example, use modifiable signage to control flows of people in a time-variable manner. Other reference implementations for controlling flows of people use movable guide elements, for example controllable doors or barriers, etc.

Such reference implementations for controlling flows of people can, however, have distinct disadvantages and limitations. For example, due to secondary circumstances, it may sometimes not be possible at all, or only in a limited manner, to implement active measures for controlling flows of people. Due to a lack of installation space, for example, it may not be possible at all, or only in a limited manner, to provide controllable doors, etc. Moreover, in some examples, actively addressing the participants in a flow of people may be undesirable or inefficient.

BRIEF SUMMARY OF THE INVENTION

For this reason, there is a need for improved techniques for controlling flows of people. There is in particular a need for techniques that eliminate at least some of the abovementioned disadvantages and limitations.

This object is achieved by the features of the independent claims. The features of the dependent claims define embodiments.

A method comprises controlling a lighting device for lighting at least one scene in an area with a first light characteristic. The method also comprises receiving measurement data indicative of the behavior of a flow of people in the area during the lighting of the at least one scene with the first light characteristic. The method comprises determining a second light characteristic on the basis of the measurement data, as well as controlling the lighting device for lighting the at least one scene with the second light characteristic.

A scene can, for example, refer to a subarea of the area. The area can therefore include a plurality of scenes. The area could be a building or a room, for example, or some other defined sector. The area could, for example, have one or more entrances for the flow of people; as well as one or more exits for the flow of people. The trajectory of the flow of people between the one or more entrances and the one or more exits can extend along one or more scenes of the area. The trajectory of the flow of people can comprise branches.

The flow of people can describe an ensemble of participants. The flow of people can, for example, be described using different behaviors, such as the speed of the flow of people, compaction of the flow of people, expansions of the flow of people, a branching factor for the flow of people, or an attractiveness factor for scenes for the flow of people. The behavior of individual participants can be predicted on the basis of such macroscopic properties of the flow of people, as well. For example, the speed of the flow of people could be indicative of the amount of time that individual participants in the flow of people spend at different scenes of the area. Compaction of the flow of people can result from multiple participants in the flow of people staying at one or more specific scenes of the area for particularly long periods of time. Depending on the geometry of the area, it can be possible for the flow of people to have branches, so that the branching factor for the flow of people is high. This means that individual participants in the flow of people can have the option to select different trajectories through the area, i.e. visit different scenes. This can correlate with the attractiveness factor, which can describe what fraction of all of the participants in the flow of people visit a particular scene.

In the various examples described herein, it would be possible for the measurement data to be indicative of the characteristics of the flow of people, such as its speed, a compaction, or a branching factor for one more scenes of the area.

Determining the second light characteristic on the basis of the measurement data, makes an adjustment of the light characteristic to the measured behavior of the flow of people possible. As a result, the flow of people can be appropriately controlled. Monitoring the actual behavior makes it possible to control the flow of people in an especially precise manner. Such techniques are based on the insight that there can be a correlation between the light characteristic used for the at least one scene in the area and the behavior of the flow of people. Some light characteristics can be especially attractive or unattractive to the participants in the flow of people, for example, so that a corresponding control of the flow of people is made possible.

Various types of light characteristics can be used in the different examples described herein. For example, the used light characteristic could be selected from the following group: light intensity; light contrast; light pressure; and light color. One or more of the aforementioned light characteristics can also be adjusted in combination with one another.

In the various examples described herein, different target values for controlling the flow of people can be used when determining the second light characteristic. A targeted control of the flow of people along specific trajectories through the area could be desirable, for example. The second light characteristic can then additionally be determined on the basis of such a target value. Additional examples of target values include: avoidance of compaction; avoidance of specific scenes; directing toward specific scenes; increasing or reducing the speed of the flow of people relative to specific scenes.

In some examples, the observed correlation between the behavior of the flow of people and the used light characteristic can be utilized in a targeted manner by a control loop. In some examples, it would be possible to implement a control loop which comprises a target behavior of the flow of people (for example determined on the basis of one or more target values) as a reference variable, the measurement data as a process variable and the second light characteristic of the lighting device as a control variable. This can therefore mean that the second light characteristic of the lighting device is iteratively changed repeatedly until the measurement data indicates a behavior of the flow of people that corresponds to the target behavior. For example, incremental changes of the second light characteristic could be used to map corresponding changes in the behavior of the flow of people through the measurement data, until the flow of people has finally achieved the target behavior. When using such a control loop, it may not be necessary to use a priori knowledge about the behavior of the flow of people as a function of the used light characteristic, for example within the context of a predetermined model. The flow of people can also be controlled in a particularly robust manner, i.e. taking into account different time-variable disturbance variables, etc.

Sometimes, however, a priori knowledge about the behavior of the flow of people as a function of the used light characteristic can be available. This a priori knowledge can then be taken into consideration when determining the second light characteristic. One example of taking a priori knowledge into consideration uses a model: for example, it would also be possible for the second light characteristic to be determined on the basis of a model of the behavior of the flow of people as a function of the second light characteristic.

This model can be prespecified. The model can provide an assumption of how a specific change in the used light characteristic will affect the behavior of the flow of people. The model can therefore anticipate an effect of the second light characteristic on the behavior of the flow of people. The use of such techniques can make it possible to achieve a desired behavior of the flow of people particularly quickly through targeted implementation of the second light characteristic. The flow of people can thus be controlled in a particularly efficient manner.

In some examples, the model could be trained empirically. To do this, it is, for example, possible to use techniques of machine learning, such as deep learning, etc. Weights of neural networks can be adjusted.

For such training, it would be possible to monitor the measurement data over a period of time, for example, for at least 10 minutes, optionally at least 30 minutes, further optionally at least 120 minutes. It has been observed that significant statistics about the behavior of the flow of people can be collected during such time periods, while at the same time the behavior of the flow of people may not yet be subjected to any, or no significant, changes. The model could then be trained on the basis of the monitoring of the measurement data. For example, specific basic assumptions mapped by the model can be verified on the basis of the monitoring of the measurement data and adjusted as necessary, if a deviation is determined. Training the model makes it possible to achieve a particularly precise control of the flow of people and to account for the potentially occurring temporal drifts in the dependence of the behavior of the flow of people on the used light characteristic by adjusting the model. Certain local peculiarities in the behavior of the flow of people, which are specific to the area under consideration, for example, can furthermore be mapped in the model by using the training. This can in particular be advantageous if reference measurement data is additionally taken into consideration for the training of the model that is taken into consideration for other areas, which may comprise different peculiarities in the behavior of the flow of people.

In some examples, a larger underlying data set than just the measurement data indicative for the behavior of the flow of people in the respective area could be used to train the model. For example, it would be possible for reference measurement data to be received, which is indicative of the behavior of at least one further flow of people in at least one further area. The model could then be trained on the basis of the reference measurement data. In other words, therefore, the reference measurement data can relate to empirical observations that relate to a correlation between the used light characteristic and the behavior of flows of people in areas other than the area to which the model is subsequently applied.

This can be possible, for example, if certain commonalities exist, such as the used light characteristic, the types of scenes in the areas, or the geometric relationship of the scenes in the areas. Incorporating a particularly large underlying data set can make it possible to train the model in a particularly comprehensive and accurate manner. This can in particular achieve that the model describes the behavior of the flow of people as a function of the used light characteristic especially accurately. In order to map local peculiarities of the considered area in the model in a suitable manner, it would, when training the model, for example be possible to give greater consideration to measurement data acquired for the considered area itself as reference measurement data indicative of the behavior of other flows of people in other areas.

The model can describe the dependence of the behavior of the flow of people on the used light characteristic taking into account one or more parameters. One example parameter would be the geometric arrangement of the at least one scene in the area. It would thus be possible for the model to describe different behaviors of the flow of people as a function of the second light characteristic for different geometric arrangements in the at least one scene in the area. For example, it would be possible for the model to predict a different behavior of the flow of people as a function of the used light characteristic for a scene located near the entrance or the exit of the area than for a scene that is located further away from the entrance or the exit of the area. Accordingly, it would be possible, for example, for the model to predict a different behavior of the flow of people as a function of the used light characteristic for a scene that must be sought out by participants in the flow of people with no or only a few alternatives when moving from the entrance to the exit than for a scene for which many alternative scenes are available to participants in the flow of people. By taking into account the geometric arrangement of the at least one scene in the area, the model can predict the behavior of the flow of people as a function of the used light characteristic in a particularly accurate manner.

Another parameter that can be taken into account by the model is, for example, the different types of the scenes under consideration. Different types of the area can alternatively or additionally be taken into account as parameters, as well. For example, for a scene that corresponds to a through-passage of the area without options for the participants in the flow of people to linger, the model could predict a different behavior of the flow of people as a function of the light characteristic than for a scene in which actions of the participants in the flow of people are possible or required and in which there are therefore opportunities for the participants in the flow of people to linger. Examples of types of areas include: airports; railway stations; office buildings; shopping centers; self-service shops; hotels; seminar buildings; etc. Examples of types of scenes for airports or railway stations refer to: entrance area; waiting area; security screening; gate area; retail area; restaurant area; transfer area; customs area; baggage area; etc. Examples of types of scenes for retail stores include: entrance area; checkout area; sales area; sales area for specific products such as the frozen food section, fresh produce section, vegetables and fruits, etc.; restaurant area; etc.

Another parameter that can be taken into account by the model relates to one or more environmental parameters. It would therefore, for example, be possible for the model to describe different behaviors of the flow of people as a function of the second light characteristic for different values of at least one environmental parameter of the at least one scene and/or the area. Environmental parameters can, for example, be parameters that are defined extrinsically, i.e. not directly as a function of the flow of people. Examples of such environmental parameters can include: time of day; weather; day of the week; daylight brightness; outside temperature and inside temperature. The model could therefore periodically predict the same behavior of the flow of people as a function of the used light characteristic for the same time of day or the same day of the week, for example. Such techniques are based on the insight that the participants in flows of people can vary as a function of such environmental parameters. It is therefore possible to predict the behavior of the flow of people as a function of the used light characteristic more accurately, if the model incudes one or more such environmental parameters as a parameter. It can generally be possible to receive relevant control data that is indicative of at least one environmental parameter of the at least one scene and/or area. Such control data can be received from corresponding measuring devices, for example. Other data, such as the day of the week or the time of day, can be received from a central location. The determination of the second light characteristic can additionally be based on the control data.

In some examples it would be possible for the second light characteristic to additionally be determined on the basis of a predetermined rate of change based upon the first light characteristic. The rate of change could, for example, describe a maximum change in the light characteristic per unit of time. It is thus possible to ensure that the light characteristic is not changed abruptly or suddenly, which could have negative effects with respect to controlling the flow of people. Within the context of the above-described control loop, such a rate of change could be taken into account as a sluggishness of the control loop or a maximum incremental change between control cycles. A change in the color temperature, for example, could be implemented over a period of several minutes, for example not less than 5 minutes or not less than 15 minutes. A change in brightness, which exceeds a relative strength of 5% compared to the maximum brightness, could also be implemented over a period of several minutes, for example not less than 5 minutes or not less than 15 minutes. In the various examples described herein, it would be possible for the rate of change of the light characteristic to correspond to a time period that is greater than a typical length of stay of participants in the flow of people in the at least one scene. This makes it possible to avoid individual participants in the flow of people being unsettled or negatively affected by the change in the light characteristic. Uncontrolled behavior of the flow of people can thus be avoided.

In some examples, it can be possible for one or more measuring devices to be controlled for the acquisition of the measurement data. A wide variety of kinds and types of measuring devices can be used in the various examples described herein. Different observables are measured depending on the type of measuring device used. Examples of such measured observables include: the current speed of the flow of people at one or more scenes; the average speed of the flow of people at one or more scenes; and the position of participants in the flow of people with respect to one or more scenes.

The current speed of the flow of people could, for example, refer to the speed of the flow of people defined over a particularly short time interval, for example integrated over one or a few seconds. On the other hand, the average speed of the flow of people could display a greater temporal averaging of said speed, which can in particular be greater than the typical rate of change of the speed of the flow of people. For example, the average speed of the flow of people could be averaged over a period of minutes or more. Such an average speed, or generally an averaged observable relating to the flow of people, can, for example, be obtained by means of integrated measurements, for example using measuring devices placed at at least one entrance and/or at least one exit of the area. For example, a differential measurement between two points along the flow of people could provide such a speed. The average speed could similarly also relate to an averaging with respect to a plurality of scenes which are sequentially traversed by the flow of people. In other examples, it would also be possible to record individual participants in the flow of people, for example their position or speed, and from that draw conclusions about the behavior of the ensemble of participants, i.e. the behavior of the flow of people.

Different measuring devices can be used to measure such observables or other observables. One example of a measuring device could include a video camera, by means of which individual participants in the flow of people are mapped using video data. The behavior of the various participants in the flow of people could then be analyzed using object recognition, and from this, inferences about the behavior of the flow of people could be made. Other examples can, for example, relate to counting the people moving through, for example at the entrance or at the exit of an area. With respect to retail stores, for example, counting the people moving through could be accomplished by using point-of-sale data. In particular the number of purchased items or the business transacted by individual participants in the flow of people could make a statement relating to the average speed of the flow of people possible. By allocating the types of purchased objects to different scenes of the area, it is also possible to provide information about the average speed of the flow of people at the corresponding scenes. An accurate determination of the behavior of the flow of people at the different scenes within the area can thus be made using such already available information. This reduces the technical complexity, because in many cases no additional measuring devices are needed.

A control comprises at least one processor. The at least one processor is configured to perform the following steps: controlling a lighting device for lighting at least one scene in an area with a first light characteristic; receiving measurement data indicative of the behavior of a flow of people in the area during the lighting of the at least one scene with the first light characteristic; determining a second light characteristic on the basis of the measurement data; and controlling the lighting device for lighting the at least one scene with the second light characteristic.

A computer program product comprises program code that can be executed by at least one processor. Execution of the program code causes the at least one processor to perform the following steps: controlling a lighting device for lighting at least one scene in an area with a first light characteristic; receiving measurement data indicative of the behavior of a flow of people in the area during the lighting of the at least one scene with the first light characteristic; determining a second light characteristic on the basis of the measurement data; and controlling the lighting device for lighting the at least one scene with the second light characteristic.

A computer program comprises program code that can be executed by at least one processor. Execution of the program code causes the at least one processor to perform the following steps: controlling a lighting device for lighting at least one scene in an area with a first light characteristic; receiving measurement data indicative of the behavior of a flow of people in the area during the lighting of the at least one scene with the first light characteristic; determining a second light characteristic on the basis of the measurement data; and controlling the lighting device for lighting the at least one scene with the second light characteristic.

A method comprises controlling a lighting device for lighting at least one scene in an area with a first light characteristic. The method also comprises receiving measurement data indicative of the behavior of at least one person in the area during the lighting of the at least one scene with the first light characteristic. The method comprises determining a second light characteristic on the basis of the measurement data, as well as controlling the lighting device for lighting the at least one scene with the second light characteristic.

A use of a lighting device for lighting at least one scene in an area with a light characteristic for controlling a flow of people is disclosed.

The features discussed above and features which will be described in the following can be used not only in the corresponding, explicitly discussed combinations, but also in other combinations or in isolation, without leaving the scope of protection of the present invention.

BRIEF DESCRIPTION OF THE FIGURES

FIG. 6 illustrates a parameterization of the model for different types of scenes.

FIG. 7 illustrates a parameterization of the model for various times of day.

DETAILED DESCRIPTION OF EMBODIMENTS

Figure 1:
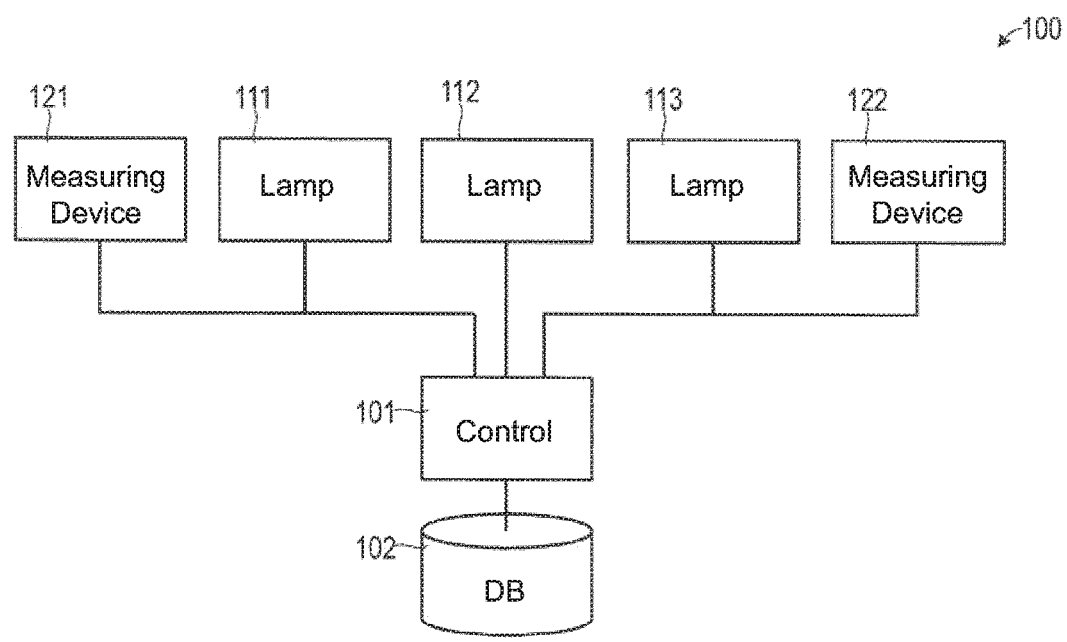
FIG. 1 schematically illustrates a system comprising a control, lamps, and measuring devices, whereby the system is configured according to various examples to control a flow of people through an area having several scenes lighted by the lamps.

The above-described properties, features, and advantages of this invention, as well as the manner in which they are achieved, will become clearer and more understandable in connection with the following description of the design examples, which will be explained in more detail in connection with the drawings.

The present invention will be explained in more detail in the following on the basis of preferred embodiments and with reference to the drawings. In the figures, the same reference signs refer to identical or similar elements. The figures are schematic representations of various embodiments of the invention. Elements shown in the figures are not necessarily shown true to scale. Rather, the various elements shown in the figures are reproduced in such a way that their function and general purpose is comprehensible to the person skilled in the art. Connections and couplings between functional units and elements shown in the figures can also be implemented as an indirect connection or coupling. A connection or coupling can be implemented in a wired or wireless manner. Functional units can be implemented as hardware, software, or a combination of hardware and software.

Various techniques relating to the control of flows of people through areas will be described in the following. The techniques described herein can, for example, be used for controlling flows of people through airports, railway stations, retail stores, shopping centers, etc. In general, the techniques described herein can be used flexibly wherever controlling flows of people with many participants through areas is desirable. Such techniques make it possible to efficiently utilize the often limited space, in particular in inner cities, and prevent delays or obstructions for individual participants of flows of people. Generally, this also promotes safety in the operation of facilities. Depending on the type of control desired, different target values relating to the behavior of the flow of people can be achieved.

Various techniques described herein are based on the insight that flows of people through an area having multiple scenes can be controlled by lighting one or more of the scenes in the area with a suitably selected light characteristic. Examples of such light characteristics include the light intensity, the light contrast, the light pressure and the light color. Such an influencing of participants in a flow of people can cause a statistically significant control of the flow of people as an ensemble consisting of multiple participants. For example, it has been observed that certain light colors have an especially attractive or unattractive effect on participants in a flow of people, so that the attractiveness of the respective scene to the flow of people can be increased or reduced in a targeted manner when the corresponding light color is used. Depending on the desired target value for the control of the flow of people, this can, for example, achieve that more or fewer participants in the flow of people visit the respective scene. Equivalent correlations can also be observed for other light characteristics.

In order to ensure the most accurate and targeted control of the flow of people, in various examples measurement data is received, which is indicative for the behavior of the flow of people in the area when lighting at least one scene of the area with a first light characteristic. A second light characteristic can then be determined on the basis of the measurement data, and a lighting device for lighting the at least one scene with the second light characteristic can be controlled. Such techniques thus make it possible to adjust the used light characteristic to the observed behavior of the flow of people.

FIG. 1 illustrates aspects relating to a system 100, which is configured for controlling flows of people according to various examples described herein. The system 100 comprises a number of lamps 111-113.

Examples of lamps include: light-emitting diodes, light-emitting diode arrays, halogen lamps, gas-discharge lamps, incandescent lamps, etc. The lamps 111-113 can be controlled by a control 101. The lamps 111-113 are configured to implement different light characteristic. Control data transmitted from the control 101 to the lamps 111-113, for example, can indicate the desired light characteristic. The communication connection, for example, between the control 101 and the lamps 111-113 can be carried out in a wireless or a wired manner, for example via a phase control modulation or a control bus system such as DALI. Further examples for the communication connection include Bluetooth, IEEE 802.15.3 wireless personal area networks or Internet Protocol (IP).

The control 101—for example implemented by a computer, FPGA or ASIC—is also connected to measuring devices 121, 122.

The measuring devices 121, 122 are configured to acquire measurement data. The measurement data is indicative of the behavior of a flow of people in an area lighted by the various lamps 111-113. Examples of measuring devices 121, 122 include: cameras having object/image recognition; people counters; cash registers having an analysis of sold items; near-field positioning of individual participants in the flow of people; etc. Different types of measuring devices 121, 122 can be used complementarily in the system 100. Different observables can be measured depending on the type of measuring device 121, 122 used. Examples of observables relating to the flow of people include: the current speed of the flow of people; the average speed of the flow of people; and the position of participants in the flow of people. Using a cash register, for example, it could be possible to assess which items are particularly sought after by participants in the flow of people. It can thus be inferred that the current speed of the flow of people in the vicinity of the sales area for particularly sought-after items is comparatively low. A corresponding statement could also be made by evaluating the video data of a camera with the aid of object recognition. It is then possible to determine that people in the vicinity of the sales area stay for a long period of time, for example, so that the speed of the flow of people there is comparatively low. A corresponding statement could also be made by placing a motion detector or a people counter in the area of the respective scene.

The control 101 is further connected to a database 102. Information relating to a model of the behavior of a flow of people as a function of the light characteristic, for example, can be stored in the database 102. The database 102 is optional.

It is possible for the control 101 and/or the database 102 to be configured in an at least partially decentralized manner with respect to the lamps 111-113 and the measuring devices 121, 122. Remote access can be accomplished via the Internet, for example. Cloud implementations are conceivable.

Figure 2:
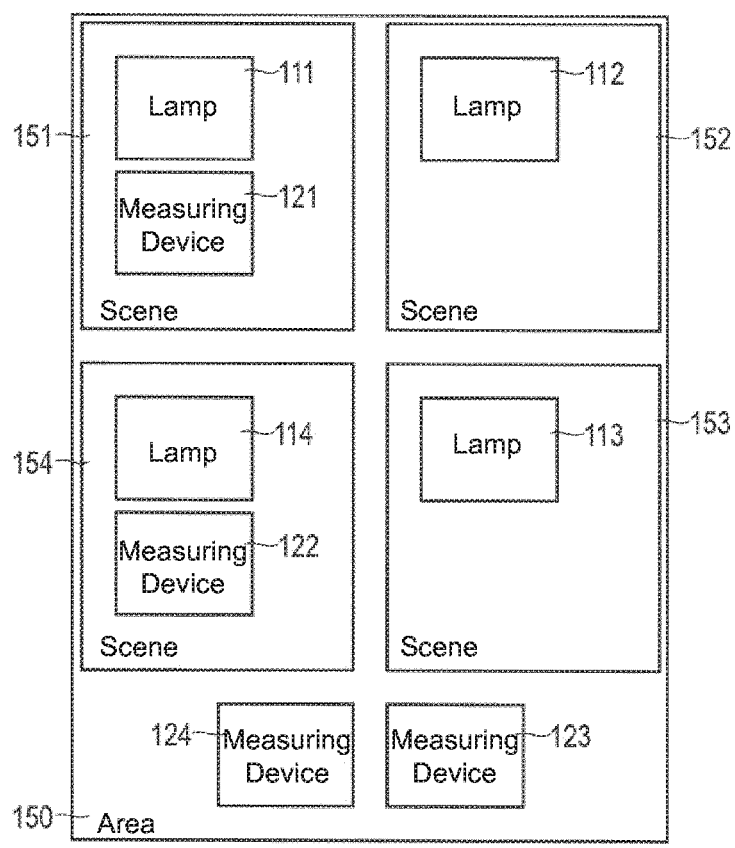
FIG. 2 schematically illustrates an allocation between scenes of the area and lamps and also measuring devices according to various examples.

FIG. 2 illustrates aspects relating to an allocation between scenes 151-154 of an area 150 to lamps 111-114 and measuring devices 121-124. In the example of FIG. 2, it can be seen that the area 150 comprises a plurality of scenes 151-154. For example, the different scenes 151-154 can be associated with different sections of the area 150. The scenes 151-154 can also be organized thematically. The area 150 could correspond to an office building, for example, and the different scenes 151-154 could, for example, correspond to an entrance area, a waiting area, an elevator area, a stairwell area, a work area, a communal kitchen, etc. The area 150 could correspond to a retail store, for example, and the different scenes 151-154 could correspond to an entrance area, an exit area, a checkout area, different sales areas, depending on the offered product, etc.

In FIG. 2 it can be seen that, in each case, one lamp 111-114 is allocated as a lighting device in the different scenes 151-154, whereby it is generally also possible for more than one lamp 111-114 to be provided per scene 151-154. The respective lamp 111-114 is configured to light the corresponding scene 151-154 with a suitable light characteristic.

Each of the scenes 151, 154 also comprises a local measuring device 121, 122, which is configured to acquire measurement data indicative of the behavior of a flow of people in the respective scene 151, 154. Measuring devices 123, 124, which are not allocated to any specific scene 151-154, are provided as well. These measuring devices 123, 124 could, for example, be positioned at a central location of the area 150. The measuring devices 123, 124 can be configured to acquire measurement data indicative of the behavior of the flow of people over the plurality of scenes 151-154 in an integrated manner. In other examples, however, it would also be possible for one of the measuring devices 123, 194 to be configured to provide measurement data indicative of the behavior of the flow of people broken down into one or more of the scenes 151-154. One example of this would be a cash register in a store, which, on the basis of the registered items, can make a statement about the behavior of the flow of people in the different areas 151-154 associated with said items.

Figure 3:
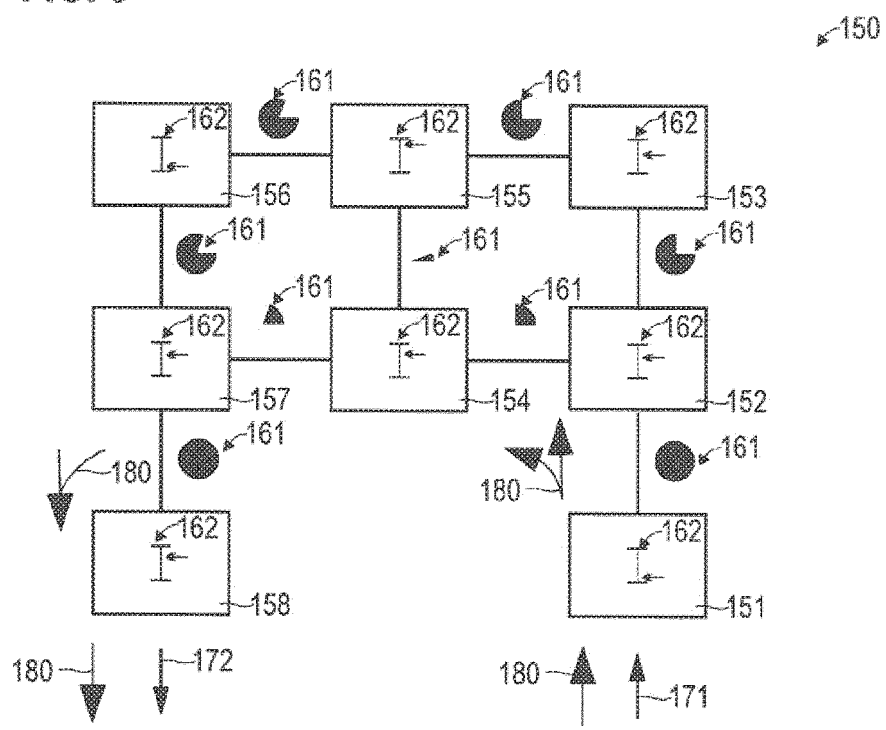
FIG. 3 schematically illustrates a geometric arrangement of the scenes in the area according to various examples.

FIG. 3 illustrates aspects relating to a geometric arrangement of the various scenes 151-158 of an area 150 with respect to one another. FIG. 3 illustrates the geometric arrangement of the various scenes 151-158 in the form of a graph. The flow of people 180 enters the area 150 through an entrance 171; generally speaking, there could be more than one entrance. The entrance 171 is associated with a scene 151. FIG. 3 schematically illustrates a speed 162 of the flow of people in the area of the scene 151. In the example of FIG. 3, the speed 162 is comparatively low in the area of scene 151 (schematically illustrated by the arrow at the lower end of the scale in FIG. 3), which is why undesirable compaction of the flow of people 180 can occur in the area of scene 151. Such compaction in the area of scene 151 can be avoided by appropriately controlling the flow of people.

The entire flow of people 180 then leaves the area of scene 151 and enters the area of scene 152 (represented in FIG. 3 by the complete quantity 161 of the flow of people 180). A branching of the flow of people takes place there and a certain portion 161 of the flow of people 180 then enters the area of scene 154, while the complementary portion 161 of the flow of people 180 enters the area of scene 153. FIG. 3 shows that the attractiveness factor of scene 153 is significantly higher than the attractiveness factor of scene 154, which is why a greater portion 161 of the flow of people 180 visits scene 153. In the example of FIG. 3, compaction can in particular occur in the area of scenes 151 and 156, because many participants in the flow of people 180 come together there with a high speed gradient. The techniques described in the following can be used to achieve suitable control of the flow of people based on the use of suitable light characteristics, for example in the area of said scenes 151, 156 and/or in the area of the adjoining scenes 155, 157, 152. The control of the flow of people 180 can thus generally, but not only, be carried out with respect to the target value of the avoidance of compaction, but also with respect to other target values.

Figure 4:
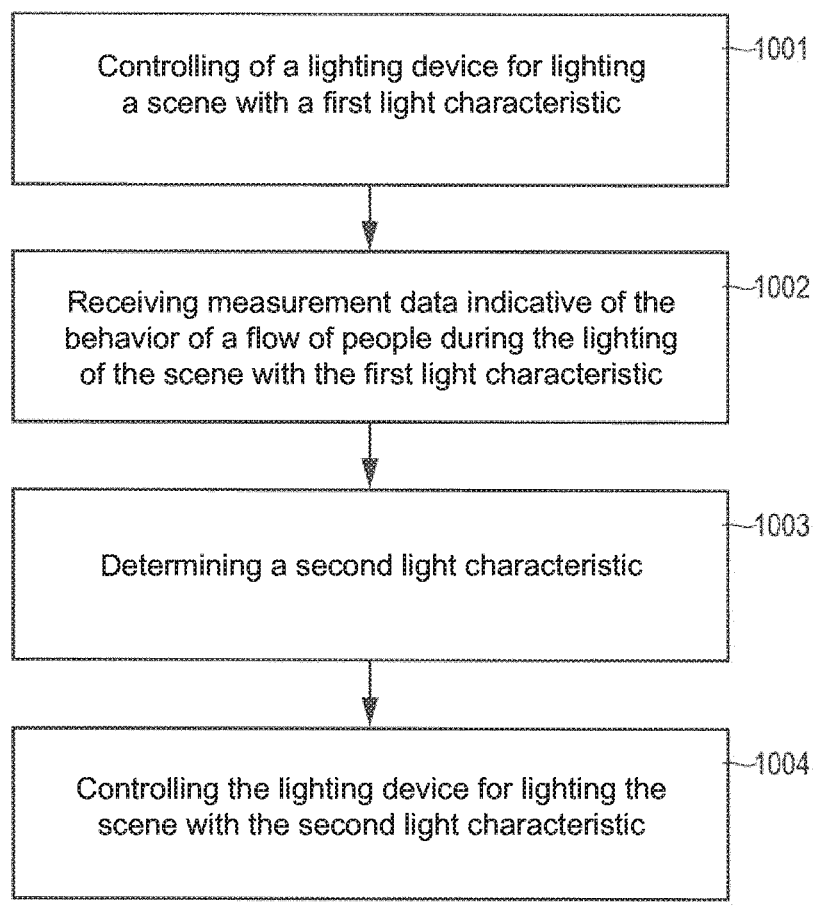
FIG. 4 is a flow diagram of a method according to various examples.

FIG. 4 is a flow diagram of an exemplary method. The method according to the example of FIG. 4 allows a control of the flow of people. First, in Step 1001, a lighting device is controlled for lighting a scene with a first light characteristic. The lighting device can comprise one or more lamps. The light characteristic can include a light intensity, a light contrast, a light pressure and/or a light color, for example. Other examples of the light characteristic include the local light distribution. The local light distribution can, for example, be adjusted on the basis of movable lamps or matrix elements.

The measurement data is then received in Step 1002. The measurement data is indicative of the behavior of a flow of people when the scene is lit with the first light characteristic. Said measurement data could, for example, be indicative of the speed of the flow of people and/or a compaction of the flow of people and/or a branching factor for the flow of people and/or an attractiveness factor for one or more scenes of the corresponding area for the flow of people.

Then, in Step 1003, a second light characteristic for the lighting device is determined and, in Step 1004, the lighting device is controlled for lighting the scene with the second light characteristic. In Step 1003, the second light characteristic can be determined on the basis of the measurement data from Step 1002. A targeted control of the flow of people on the basis of the currently measured behavior is thus possible. In order to avoid an abrupt change in the light characteristic, for example, it would also be possible to determine the second light characteristic on the basis of the first light characteristic in Step 1003, for example by including a predetermined rate of change based upon the first light characteristic. A specific target value for controlling the flow of people, for example, could be taken into account in Step 1003. Examples of such target values include: avoidance of compaction, increasing the attractiveness of certain scenes, etc.

It is also generally possible to use different techniques for determining the second light characteristic in Step 1003. In one exemplary technique, a control loop is used to reliably implement a target behavior of the flow of people as a reference variable of the corresponding control loop.

Figure 5:
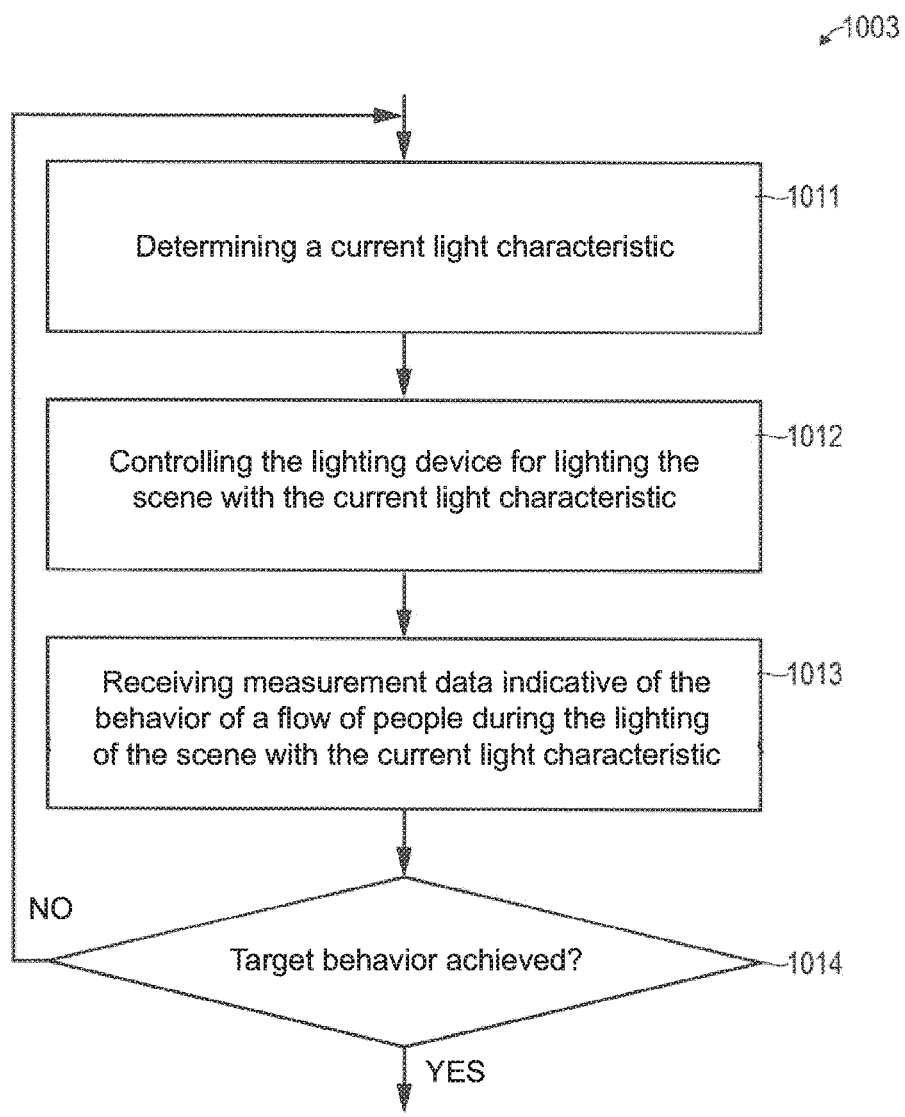
FIG. 5 is a flow diagram of a method according to various examples.

FIG. 5 is a flow diagram of an exemplary method. FIG. 5 illustrates aspects relating to the determination of the second light characteristic. FIG. 5 in particular illustrates aspects relating to the determination of the second light characteristic by implementing a control loop. Such techniques have the advantage that having a priori knowledge, for example in the form of a model, about the dependence of the behavior of the flow of people on the used light characteristic may not be necessary.

To begin with, in Step 1011, a current light characteristic is determined. The current light characteristic could, for example, be determined on the basis of a specific rate of change with respect to the previously used light characteristic. In other words, incremental changes in the light characteristic can be used. It is possible, for example, to take into account a certain amount of latency in order to not exceed a predetermined maximum rate of change of the light characteristic used.

Then, in Step 1012, the lighting device is controlled for lighting the scene with the current light characteristic from Step 1011. Measurement data is again received in Step 1013, which is indicative of the behavior of the flow of people when lighting the scene with the current light characteristic. On the basis of the measurement data from Step 1013, Step 1014 then checks whether the currently observed behavior of the flow of people already corresponds to the target behavior of the flow of people. If this is not the case, Steps 1011-1014 are repeated. Otherwise, the current light characteristic continues to be used.

In FIG. 5, therefore, it can be seen that it can be possible to implement a control loop having a target behavior of the flow of people as a reference variable, the measurement data as a process variable and the light characteristic of the lighting device as a control variable.

Alternatively or in addition to such a determination of the light characteristic on the basis of the implementation of the control loop, in some examples it can also be desirable to include further information about a dependence of the behavior of the flow of people on the light characteristic. It can thus, for example, be possible to use a priori knowledge about such a dependence for a targeted and quick control of the flow of people.

Figure 6:
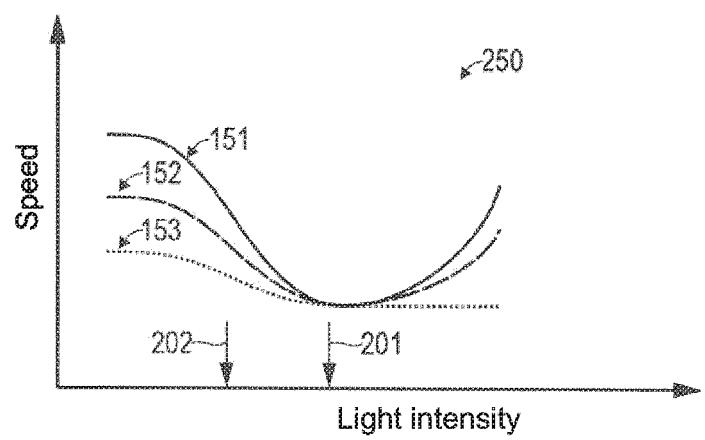
FIG. 6 schematically illustrates a model for a speed of a flow of people as a function of the light intensity used for lighting scenes according to various examples, whereby

FIG. 6 illustrates aspects relating to a 250 model of the behavior of the flow of people as a function of the used light characteristic. The model can be taken into account when determining the light characteristic to be used. The example of FIG. 6 in particular shows a model 250, which illustrates a correlation between the speed of the flow of people (vertical axis in FIG. 6) and the used light intensity (horizontal axis in FIG. 6). The qualitative and quantitative dependence in FIG. 6 is merely an example.

In the example of FIG. 6, it can be seen that the model 250 describes different speeds of the flow of people as a function of the variable light intensity for different scenes 151-153. The parametrization relating to the observed scene 151-153 could be the result of different geometric arrangements of the scenes 151-153 in the area 150, for example, and/or the result of different types of the scenes 151-153.

A first light intensity 201 and a second light intensity 202 are highlighted in FIG. 6. When lighting the scene 151 with the first light intensity 201, for example, the measurement data could indicate a too low speed of the flow of people 180. The second light intensity 202 could then be determined as being suitable for controlling the flow of people 180. It can thus be possible to determine the second light intensity 202 on the basis of the model 250 of the behavior of the flow of people, here in particular the speed, as a function of the used light characteristic, here in particular the light intensity.

Generally, different techniques can be used to maintain or train the model 250. The model could be defined using techniques of machine learning, for example. To do this, light characteristics used over a longer period of time can be correlated with the observed behavior of the flow of people. The measurement data could be monitored for a time period of at least 10 minutes, optionally at least 30 minutes, further optionally at least 120 minutes, and the model 250 could then be trained based on the monitoring of the measurement data. It is generally also possible to consider reference measurement data acquired for other areas or other scenes.

In addition to such dependencies of the model 250 on the geometry or the types of scenes 151-153, as shown in FIG. 6, the model can also include other environmental parameters.

Figure 7:
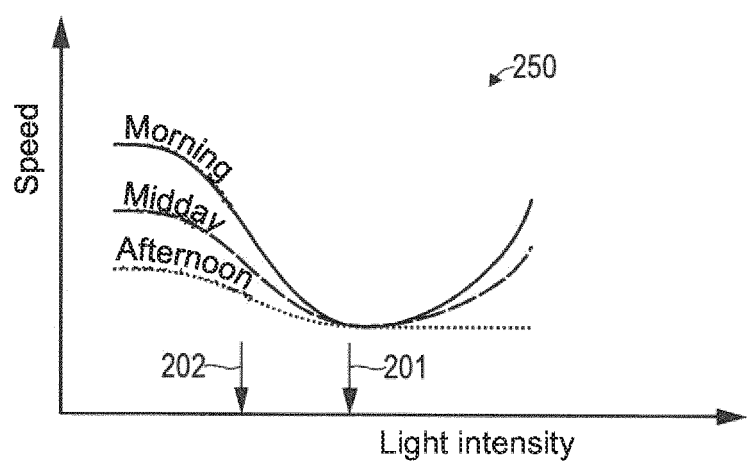
FIG. 7 schematically illustrates a model for a speed of a flow of people as a function of the light intensity used for lighting scenes according to various examples, whereby

FIG. 7 illustrates aspects relating to a model of the behavior of a flow of people as a function of a used light characteristic. The example of FIG. 7 generally corresponds to the example of FIG. 6. However, FIG. 7 also shows a parameterization of the model 250 in relation to environmental parameters, here in particular the time of day. Other environmental parameters, such as the weather, the day of the week, daylight brightness, outside temperature or inside temperature, can generally be taken into consideration as well. Relevant control data indicative of one or more environmental parameters, for example, can be received, and the light characteristic to be used, here the light intensity 202, can be determined on the basis of the control data.

In summary, techniques have been described above, which can be used to carry out a suitable control of a flow of people. In doing so, the flow of people is controlled by changing the light characteristic used for lighting one or more scenes of an area. The control of the flow of people can generally take place with respect to different target values.

Of course, the features of the above-described embodiments and aspects of the invention can be combined with one another. The features can in particular be used not only in the described combinations, but also in other combinations or individually, without leaving the field of the invention.

The invention claimed is:

1. A method comprising:
   controlling a lighting device (111-113) for lighting at least one scene (151-158) in an area (150) with a first light characteristic (201, 202);
   receiving measurement data indicative of the behavior of a flow of people (180) in the area (150) during the lighting of the at least one scene (151-158) with the first light characteristic (201, 202);
   determining a second light characteristic (201, 202) on the basis of the measurement data;
   controlling the lighting device (111-113) for lighting the at least one scene (151-158) with the second light characteristic (201, 202);
   implementing a control loop having a target behavior of the flow of people (180) as a reference variable, the measurement data as a process variable, and the second light characteristic (201, 202) of the lighting device (111-113) as a control variable.

2. The method according to claim 1 wherein the second light characteristic (201, 202) is additionally determined on the basis of a model (250) of the behavior of the flow of people (180) as a function of the second light characteristic (201, 202).

3. The method according to claim 2, further comprising:
   monitoring of the measurement data over a period of at least 10 minutes; and
   training the model (250) on the basis of the monitoring of the measurement data.

4. The method according to claim 2, further comprising:
   receiving reference measurement data indicative of the behavior of at least one further flow of people (180) in at least one further area (150); and
   training the model (250) on the basis of the reference measurement data.

5. The method according to claim 2, wherein the model (250) describes different behaviors of the flow of people (180) as a function of the second light characteristic (201, 202) for different geometric arrangements of the at least one scene (151-158) in the area (150).

6. The method according to claim 2, wherein the model (250) describes different behaviors of the flow of people (180) as a function of the second light characteristic (201, 202) for different types of the at least one scene (151-158).

7. The method according to claim 2, wherein the model (250) describes different behaviors of the flow of people (180) as a function of the second light characteristic (201, 202) for different values of at least one environmental parameter of the at least one scene (151-158) and/or the area (150).

8. The method according to claim 7, wherein the at least one environmental parameter is selected from the following group: time of day; weather; day of the week; daylight brightness; outside temperature and inside temperature.

9. The method according to claim 2, further comprising:
   monitoring of the measurement data over a period of at least 30 minutes; and
   training the model (250) on the basis of the monitoring of the measurement data.

10. The method according to claim 2, further comprising:
    monitoring of the measurement data over a period of at least 120 minutes; and
    training the model (250) on the basis of the monitoring of the measurement data.

11. The method according to claim 1, further comprising:
    receiving control data which is indicative for at least one environmental parameter of the at least one scene (151-158) and/or the area (150);
    wherein the determination of the second light characteristic (201, 202) is additionally based on the control data.

12. The method according to claim 11, wherein the at least one environmental parameter is selected from the following group: time of day; weather; day of the week; daylight brightness; outside temperature and inside temperature.

13. The method according to claim 1,
    wherein the second light characteristic (201, 202) is additionally determined on the basis of a predetermined rate of change based upon the first light characteristic (201, 202), and
    wherein the rate of change optionally corresponds to a time period that is greater than an average length of stay of participants in the flow of people (180) in the at least one scene (151-158).

14. The method according to claim 1, wherein the measurement data is indicative for elements selected from the following group: a speed (162) of the flow of people (180); at least one compaction of the flow of people (180); a branching factor for the flow of people (180); and an attractiveness factor for the at least one scene (151-158) for the flow of people.

15. The method according to claim 1, further comprising:
    controlling at least one measuring device (121) for acquiring the measurement data, wherein the at least one measuring device (121) measures one or more of the following observables: the current speed of the flow of people (180) at the least one scene (151-158); the average speed of the flow of people (180) at the least one scene (151-158); and the position of participants in the flow of people (180) with respect to the at least one scene (151-158).

16. The method according to claim 1, wherein the first light characteristic (201, 202) and/or the second light characteristic (201, 202) comprise one or more elements of the following group: light intensity; light contrast; light pressure; light color; and local light distribution.

* * * * *